Sept. 21, 1965   W. KASTEN   3,207,311
FILTER ASSEMBLY WITH MEANS TO REGULATE AXIAL COMPRESSION
Filed Jan. 11, 1962
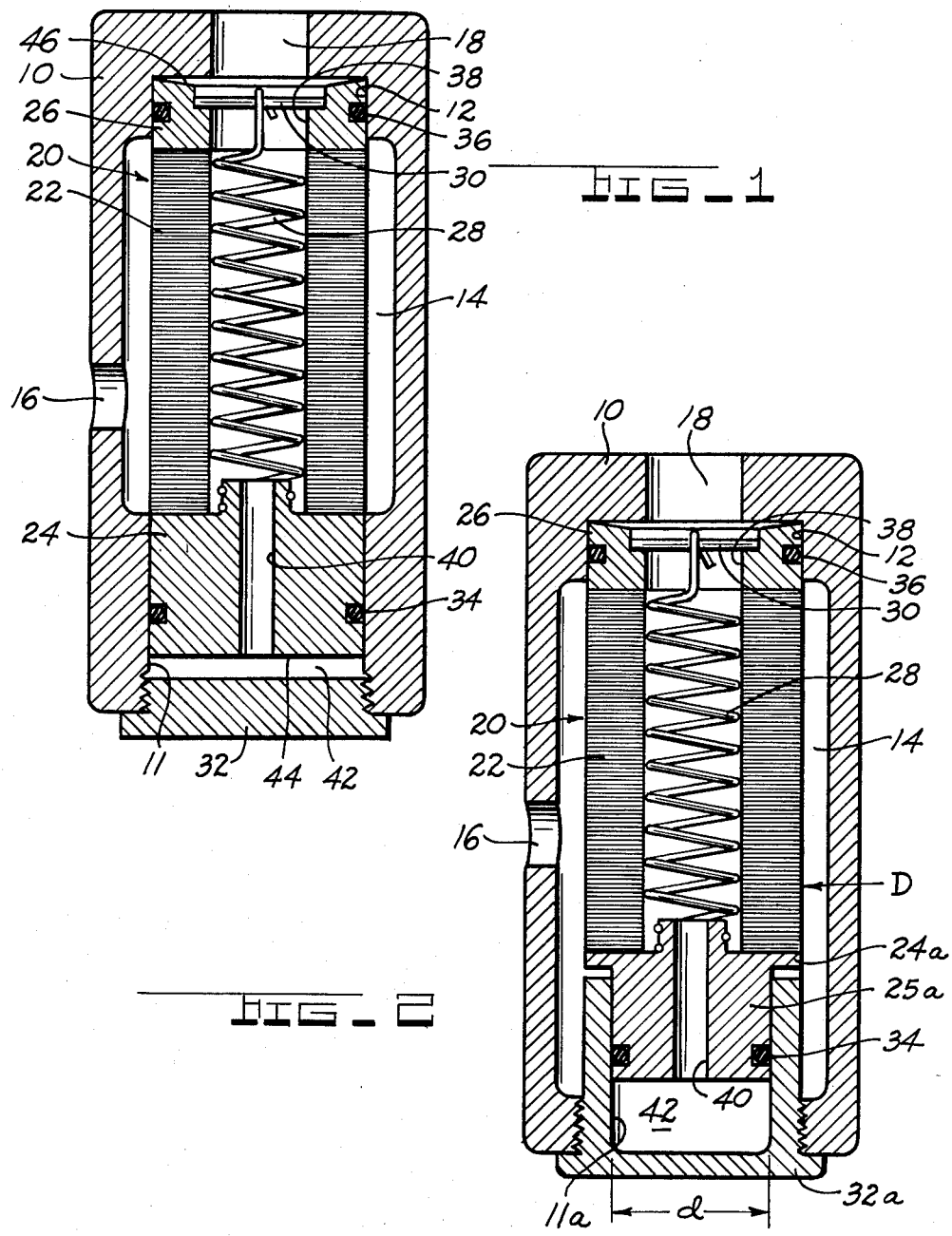
INVENTOR.
WALTER KASTEN.
BY
William N. Antonis
ATTORNEY.

United States Patent Office 3,207,311
Patented Sept. 21, 1965

3,207,311
FILTER ASSEMBLY WITH MEANS TO REGULATE
AXIAL COMPRESSION
Walter Kasten, Madison Heights, Mich., assignor to The
Bendix Corporation, Madison Heights, Mich., a corporation of Delaware
Filed Jan. 11, 1962, Ser. No. 165,593
5 Claims. (Cl. 210—137)

This invention relates to filters and more specifically to edge-type filters.

One of the desirable features of a conventional spring loaded stacked washer-type element wherein flow is from the outside thereof to the inside thereof is that, as the differential in pressure across the element increases, the spaces between the washers decrease, thereby resulting in a higher degree of filtration. In other words, the conventional endplate means of such elements act as piston members which are subjected on one side thereof to a higher filter inlet pressure and on the other side thereof to a lower filter outlet pressure, the resultant force of which is in a direction tending to compress washer-type elements.

However, under certain operating conditions, for example, if low viscosity fluid or fluid of very low temperature is to be filtered, it may be desirable to have an element which is unaffected by the differential in pressure between the filter inlet port and filter outlet port.

Accordingly, it is an object of this invention to provide a filter unit construction in which the fluid pressures acting on the filter element in an axial direction are substantially balanced.

More specifically, it is an object of this invention to provide in an edge-type filter unit, means for eliminating the fluid compressive forces acting on said element which tend to reduce the pore size thereof.

Another object of this invention is to provide an edge-type filter unit which includes guide means in said housing for operatively receiving the endplate of the edge-type element and for cooperating with said endplate to provide a substantially pressure balanced filter construction.

The above and other objects and features of the invention will become apparent from the following description of the device taken in connection with the accompanying drawing which forms a part of this specification and in which:

FIGURE 1 is a sectional view of an edge-type filter unit constructed in accordance with my invention; and FIGURE 2 is a sectional view, similar to FIGURE 1, showing another embodiment of my invention.

Referring to FIGURE 1, it will be observed that numeral 10 indicates a filter housing having guide bores 11 and 12 at opposed ends thereof and a chamber 14 therebetween which is in communication with an inlet port 16 and an outlet port 18. A filter assembly 20 is located in chamber 14 and is interposed between the inlet and outlet ports for filtering the fluid flowing between said ports. The filter assembly includes a compressible tubular edge-type filter pack 22 which may be formed of a plurality of washer-like elements or by layers of ribbon wound material, a piston-like endplate 24 which abuts one end of the tubular filter pack and is located in bore 11, a ferrule or endplate 26 which abuts the other end of said filter pack and is located in bore 12, and a tension spring 28 which is operatively connected to endplate 24 at one end thereof and to cross pin 30 at the other end thereof. Threaded into bore 11 is an end closure member 32. It will also be noted that O-ring seals 34 and 36 are provided in the endplates 24 and 26 to prevent leakage of fluid between the endplates and the filter housing.

During operation fluid to be filtered enters the housing chamber 14 through inlet port 16 and is forced through the edge-type filter pack 22 from the outside thereof to the inside thereof from whence it is discharged through outlet port 18 via opening 38 in ferrule 26. A drilled hole 40 communicates the interior of the filter element 22 with a chamber 42. By communicating outlet pressure to the remote ends 44 and 46 of endplates 24 and 26, as shown in FIGURE 1, it is possible to substantially eliminate the axial fluid compressive forces acting on the filter pack and limit the compressive forces to those created by tension spring 28. Obviously, this pressure balancing arrangement would be just as beneficial for inside-out flow where the differential pressures existing in a conventional arrangement would tend to cause the filter pack to extend rather than compress. Thus, in FIGURE 1, since substantially equal pressures act on substantially equal areas, the filter pack will be unaffected by the differences in pressure existing between the filter inlet and outlet.

FIGURE 2 shows another embodiment of my invention wherein the filter structure is only semi-balanced. In this figure, parts which are the same as those in FIGURE 1 have been given the same numerals. Such an arrangement may be useful where a limited amount of hydraulic compressive forces may be desired. Accordingly, it will be seen that in this embodiment the pressure differential between the inlet port and outlet port acts over an effective area equal to $D-d$ and that the semi-balanced condition is achieved through use of an end closure member 32a which contains a guide bore 11a having a diameter somewhat less than the diameter of the filter pack 22 for receiving a piston-like extension 25a of endplate 24a. It will be noted that the endplate diameter D is greater than the piston extension diameter d.

Those acquainted with this art will readily understand that the invention herein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A filter unit comprising a housing having a bore at opposed ends thereof and a chamber therebetween, inlet and outlet ports communicating with said chamber, a filter assembly located in said chamber and interposed between said inlet and outlet ports for filtering fluid flowing therebetween, said filter assembly including a compressible tubular element formed from a plurality of washer-like elements in registered face to face contact, said elements having the outer periphery thereof communicating with said inlet port and the inner periphery thereof communicating with said outlet port, an endplate abutting one end of said tubular element and located in one of said bores, sealing means located between said endplate and said one bore for preventing flow therebetween, a ferrule abutting the other end of said tubular element and located in the other of said bores, sealing means located between said ferrule and said other bore for preventing flow therebetween, spring means operatively connected to said endplate and ferrule for maintaining same in abutting relationship with said tubular element, and passage means for communicating the remote ends of said endplate and ferrule with said outlet port.

2. A filter unit comprising a housing having a bore at opposed ends thereof and a chamber therebetween, inlet and outlet ports communicating with said chamber, a filter assembly located in said chamber and interposed between said inlet and outlet port for filtering fluid flowing therebetween, said filter assembly including a hollow compressible element formed from a series of registered face to face contacting layers of material, said element having the outer periphery thereof communicating with one of said ports and the inner periphery thereof communicating with the other of said ports, a first endplate abutting one end of said hollow element and located in one of said bores, a second endplate abutting the other end of said hollow element and located in the other of said bores, sealing means located between said endplates and bores for preventing flow therebetween, resilient means operatively connected to said endplates for maintaining same in abutting relationship with said hollow element, and passage means for communicating the remote ends of said endplates with the other of said ports.

3. A filter unit as defined in claim 2 wherein said passage means includes a drilled hole extending through each of said endplates.

4. A filter unit as defined in claim 2 wherein said endplates, hollow element, and bores are of substantially equal diameters.

5. A filter unit as defined in claim 2 wherein one of said bores is of lesser diameter than said associated endplate and receives an endplate extension of said same lesser diameter.

References Cited by the Examiner

UNITED STATES PATENTS

| | | | |
|---|---|---|---|
| 2,079,475 | 5/37 | Williams | 210—488 X |
| 2,575,900 | 11/51 | Vokes | 210—131 |
| 2,692,686 | 10/54 | Fleck et al. | 210—488 X |
| 2,855,106 | 10/58 | English | 210—488 |
| 3,053,389 | 9/62 | Rosaen | 210—131 X |

FOREIGN PATENTS

| | | |
|---|---|---|
| 919,340 | 11/46 | France. |
| 107,090 | 6/17 | Great Britain. |

REUBEN FRIEDMAN, *Primary Examiner.*

HERBERT L. MARTIN, *Examiner.*